H. T. JOHNSON, DEC'D.
N. F. JOHNSON, ADMINISTRATRIX.
DRY BATTERY CONTAINER.
APPLICATION FILED JULY 18, 1912.

1,105,144.

Patented July 28, 1914.

WITNESSES

INVENTOR
HARRY T. JOHNSON
BY
ATTORNEYS

UNITED STATES PATENT OFFICE.

HARRY T. JOHNSON, OF NEW YORK, N. Y.; NETTIE F. JOHNSON ADMINISTRATRIX OF SAID HARRY T. JOHNSON, DECEASED.

DRY-BATTERY CONTAINER.

1,105,144. Specification of Letters Patent. Patented July 28, 1914.

Application filed July 18, 1912. Serial No. 710,173.

*To all whom it may concern:*

Be it known that I, HARRY T. JOHNSON, a citizen of the United States, and a resident of New York, in the county of New York and State of New York, have invented certain new and useful Improvements in Dry-Battery Containers, of which the following is a specification.

This invention relates to cartons or packages in which a plurality of dry battery cells are secured to form a battery unit.

The object of the invention is to provide a cheap and efficient package for dry batteries such as are connected in series or multiple to form a battery unit of increased power and one in which the batteries are firmly secured to each other and to an outer inclosure in as economical a manner as possible.

I am aware that dry battery units have heretofore been made up by embedding the individual cells in a mass of tar or similar material which is located in a wooden or metallic inclosure. This makes a very expensive structure which is not suitable for use with the cheaper grades of batteries nor for ordinary use owing to the high cost.

By practising this invention any number of cells can be firmly secured together to form a unit at but a very small additional cost over the cost of the cells *per se*.

The invention consists in the improved battery unit hereinafter more particularly described and then specified in the claims.

Figure 1:
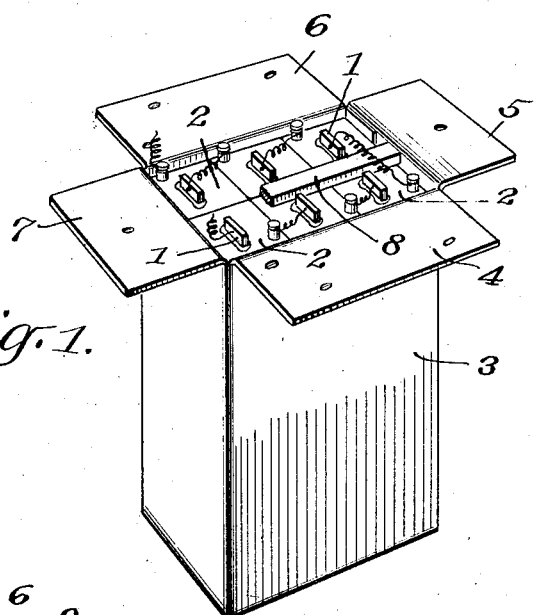
Figure 2:
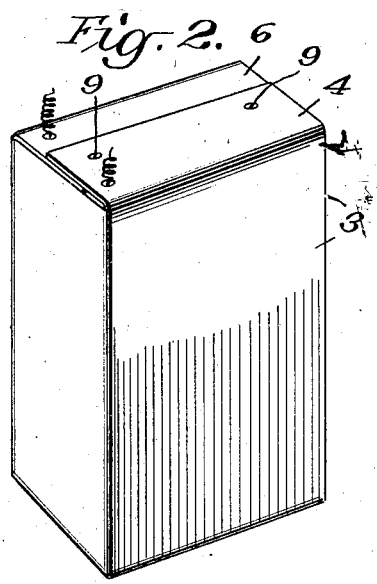
Figure 4:
Figure 3:
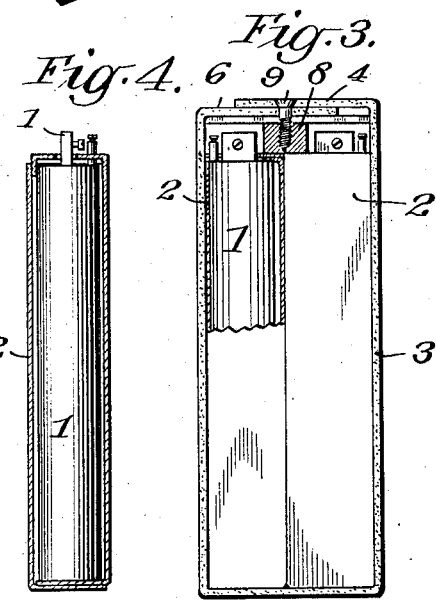

In the accompanying drawings, Figure 1 is a perspective view of a battery unit constructed in accordance with this invention, the cover being open. Fig. 2 is a similar view of the same with the cover closed. Fig. 3 is a vertical section through the same. Fig. 4 is a detached view of one of the battery cells, the cell container being shown in section.

1 indicates the ordinary dry battery cell of which there may be any desired number connected together by suitable wires according to any desired wiring system to form the unit. Each cell is located in a separate paper container 2, which may be the ordinary container in which the cells are customarily sold individually, the carbon and zinc terminals of the cells protruding up through openings in the top of the containers in the usual manner. The containers 2 are placed in an inclosure or carton 3 also preferably formed of cardboard or paper and in which the containers fit snugly.

According to one manner of carrying the invention into effect, the sides of the containers 2 are brought into sidewise contact and secured to each other along their sides by means of a suitable adhesive such as ordinary glue. The inner sides as well as the bottom of the carton 3 are also provided with a coating of glue or similar adhesive by which the sides of the containers 2 other than those sides which are in contact with other containers are firmly fastened to the carton. The carton 3 is provided with a cover preferably made up of flaps 4, 5, 6 and 7, which fold over and close the opening of the carton and by gluing the lapping edges of the flaps the batteries and carton are united into a practically unitary structure.

According to another manner of carrying out the invention, it is not necessary to glue the containers 2 to each other and to the carton 3 but a fastening strip 8 of any suitable material, as for instance wood, is placed on top of the containers 2 in such position that it engages a portion of the top of each container or spans the juncture between pairs of the containers as shown. This strip fits more or less loosely within the carton 3 and is not necessarily secured to the containers 2 but when the cover flaps 4, 5, 6 and 7 are folded over, one or more screws 9 are fastened through the overlapping upper flaps 4 and 6 and to the strip 8. Thus after the screws 9 are fastened down, the battery containers 2 are firmly held in place in the carton 3 so that any tossing around of the unit will not cause dislocation of the cells with relation to each other and the carton 3.

What I claim as my invention is:

1. In a device of the character described, the combination of a plurality of paper containers adapted to hold dry battery cells and arranged in pairs, a paper carton in which said containers are located and fastening means spanning the juncture between the pairs of said containers, said carton having a flap cover secured to said fastening means and provided with openings through which the terminal wires from the batteries pass.

2. In a device of the character described, the combination of a plurality of paper containers adapted to hold dry battery cells, a paper carton in which said containers are located, said carton being provided with overlapping flaps to close the opening thereof and a fastening strip engaging a portion only of the top of each container to secure the same in said carton, some of said flaps being provided with openings through which the terminal wires from the batteries pass and fastening screws securing said flaps to said fastening strip.

Signed at New York in the county of New York and State of New York this 16th day of July A. D. 1912.

HARRY T. JOHNSON.

Witnesses:
BURTIS H. ELLIS,
JOHN F. HEANEY.

Copies of this patent may be obtained for five cents each, by addressing the "Commissioner of Patents, Washington, D. C."